United States Patent [19]

Resendez et al.

[11] Patent Number: 5,690,003
[45] Date of Patent: Nov. 25, 1997

[54] METHOD OF FORMING A DRILL BIT WITH DEBRIS CONVEYING FLUTE

[75] Inventors: Michael R. Resendez, Elgin, S.C.; James B. Mason, Worcester, Mass.

[73] Assignee: Black & Decker Inc., Newark, Del.

[21] Appl. No.: 662,543

[22] Filed: Jun. 13, 1996

Related U.S. Application Data

[62] Division of Ser. No. 513,372, Aug. 10, 1995, Pat. No. 5,641,028.

[51] Int. Cl.⁶ ................................................. B21K 5/04
[52] U.S. Cl. ................................................. 76/108.6
[58] Field of Search ................................. 30/108.1, 108.6

[56] References Cited

U.S. PATENT DOCUMENTS

| | | | |
|---|---|---|---|
| 1,151,247 | 8/1915 | Denk | 76/108.6 |
| 1,543,608 | 6/1925 | Leidecker | 76/108.6 |
| 2,294,969 | 9/1942 | Engvall et al. | |
| 2,533,227 | 12/1950 | Delaney | 76/108.6 |
| 2,879,036 | 3/1959 | Wheeler | |
| 3,893,353 | 7/1975 | Lahmeyer | 76/108.6 |
| 4,898,503 | 2/1990 | Barish | 76/108.6 |
| 4,967,855 | 11/1990 | Moser | |
| 5,195,404 | 3/1993 | Notter et al. | 76/108.6 |
| 5,272,940 | 12/1993 | Diskin | 76/108.6 |
| 5,375,672 | 12/1994 | Peay et al. | |

FOREIGN PATENT DOCUMENTS

| | | |
|---|---|---|
| 25 42 001 A1 | 3/1977 | Germany. |
| 1270347 | 4/1972 | United Kingdom. |

*Primary Examiner*—Hwei-Siu Payer
*Attorney, Agent, or Firm*—Harness, Dickey & Pierce, P.L.C.

[57] ABSTRACT

A cutting tool or drill bit (10) has a shank (12) with two ends. A chucking end (14) is on one end of the shank (12) and a cutting end (16) is on the other end of the shank (12). At least one flute (30) is formed on the shank (12) between the chucking (14) and cutting ends (16). The flute (30) includes a web (36) and a debris channel (32). The web (36) includes a first (38) and second (40) surface continuous with a debris channel side wall (34). The first surface (38) is substantially parallel to the shank longitudinal axis (18) and the second surface (40) is on an angle from about 100° to about 120° with respect to the shank longitudinal axis (18). The second surface forms the base of the debris channel or groove (32) with the debris channel side wall (34). The debris channel side wall (34) is on an angle from about 10° to about 20° with respect to the shank longitudinal axis (18). A ratio exists between the axial length of the first surface to the axial length of debris channel surface of about 2:1 to about 4:1. Also disclosed is a method of cold rolling a blank (60) to form the above drill bit (10).

5 Claims, 2 Drawing Sheets

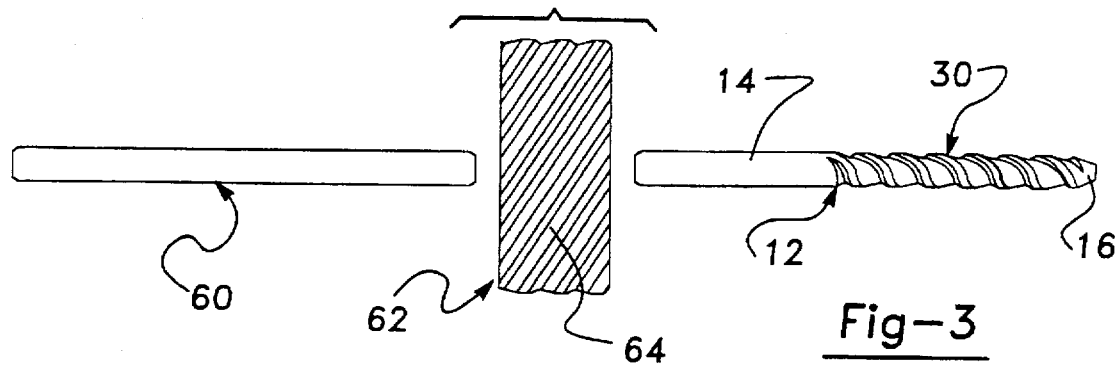
*Fig-3*
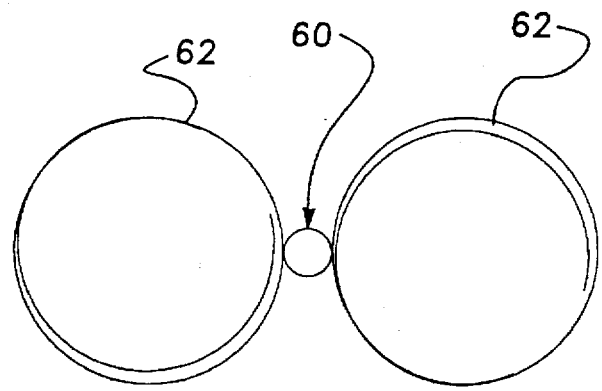
*Fig-3a*
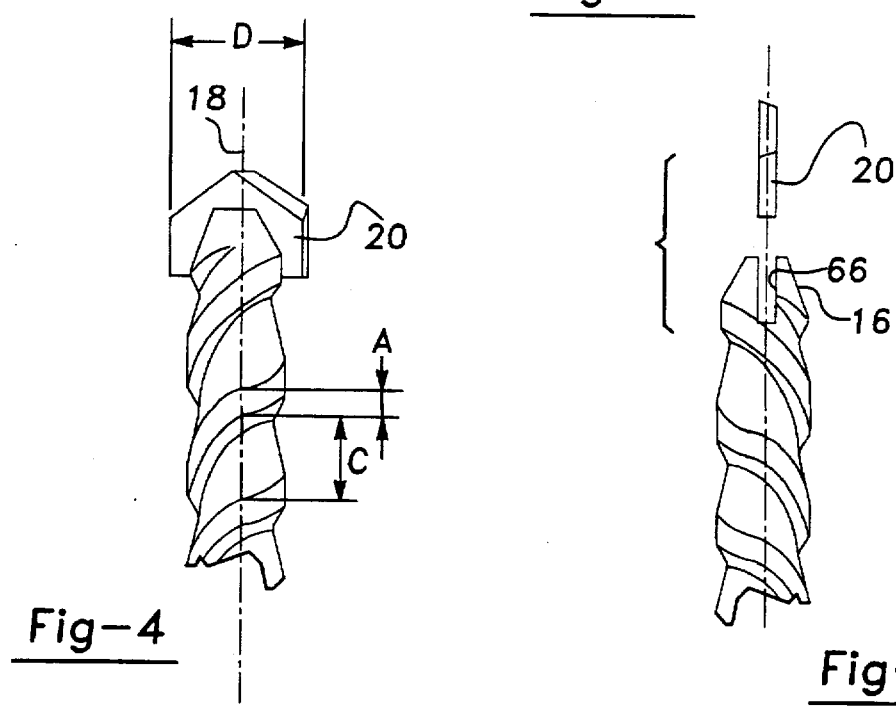
*Fig-4*
*Fig-4a*

METHOD OF FORMING A DRILL BIT WITH DEBRIS CONVEYING FLUTE

This is a division of U.S. patent application Ser. No. 08/513,372 filed Aug. 10, 1995, now U.S. Pat. No. 5,641,028.

BACKGROUND OF THE INVENTION

The present invention relates to cutting tools or drill bits, and more particularly, to cutting tools which are used in hammering, percussive, or rotary boring or drilling applications in concrete, aggregate, masonry or the like material.

When drilling concrete, aggregate or the like materials, generally three types of cutting tools or bits are used. These bits can be defined as hammer bits, percussive bits, and rotary masonry bits. All of the bits have one thing in common: A need to exit the created debris from the drilled hole. In order to remove debris from the hole, the flute is important in exiting the debris from the hole. Parameters which are important in designing debris channels are a base surface, a side wall surface as well as a web or back surface which connects the base surface with the side wall surface axially along the longitudinal axis of the bit. Equally important is the angle the surfaces make with respect to one another and to the longitudinal axis.

Existing hammer, percussive and rotary masonry bits, while being provided with different types of flute design, do not optimumly eject debris from the forming hole. Also, several of the flutes are worked such as by grinding in order to provide proper orientation of the shank for insertion of the inserts into the shank.

SUMMARY OF THE INVENTION

Accordingly, it is an object of the present invention to provide the art with a cutting tool or drill bit which will reduce the time to drill holes into concrete, aggregate or the like material and improve the quality of the hole. The present invention has an improved flute which reduces choking and better ejects debris from the forming hole. Also, the flutes are formed onto the drill bit during a cold rolling process. The process along with the geometry of the flute enables proper orientation of the flute during the cutting of the tip prior to addition of the insert to the shank.

In accordance with one aspect of the present invention, a drill bit comprises a shank having two ends and defining a longitudinal axis. One of the ends includes a chucking end while the other end has a cutting end or head. At least one flute is formed on the shank between the chucking end and the cutting end. The flute includes a web and a debris channel. The web includes a first and second surface with the first surface substantially parallel to the shank axis and continuous with the debris channel surface along the longitudinal axis. The second surface extends inwardly from the first surface and forms the base of the debris channel. The second surface is on an angle with respect to the longitudinal axis of from about 100° to 120°. A debris channel surface is between the first and second surfaces. The debris channel surface forms a side wall of the debris channel and is on an angle of from about 10° to 20° preferably about 15° with respect to the longitudinal axis of the shank. Also, a ratio exists with respect to the axial length of the first surface to the axial length of the debris channel surface along the longitudinal axis of from about 2.0:1 to about 4:1, preferably, about 2.3:1 to about 2:1, and most prefer the ratio is about 3:1. Also, a ratio exists with respect to the axial length of the first surface to the working diameter of the bit. The ratio is from about 1:3 to about 1:5, preferably 1:4.

In accordance with a second aspect of the invention, a method of forming the drill bit is disclosed. The method includes providing a pair of rotating dies as well as the blank. The blank is moved through the dies. The bit is formed via cold rolling to include a chucking end, cutting end, and the above described flute. The drill bit cutting end is then cut to include a slot and an insert is secured by welding or brazing into the slot. This process enables the drill bit to be formed by an inexpensive cold rolling process. The slow spiral shape of the drill bit (less threads per inch), enables orientation of the flute such that when an insert slot is cut into the flute, the flute is always in proper orientation so that the slot may be cut by automated equipment and is always in the same position on the cutting head.

Additional objects and advantages of the invention will be apparent from the detailed description of the preferred embodiment, the appended claims and the accompanying drawings, or may be learned by practice of the invention.

BRIEF DESCRIPTION OF THE DRAWINGS

The accompanying drawings, which are incorporated in and constitute a part of the specification, illustrate an embodiment of the present invention and together, with the description, serve to explain the principles of the invention. In the drawings, the same reference numeral indicates the same parts.

FIG. 3 is an elevation schematic view of a blank and die pair used to form a bit in accordance with the invention.

FIG. 3a is a front plan view of FIG. 3.

FIG. 4 is an elevation view of a cutting head of FIG. 1.

FIG. 4a is a side elevation view of the cold formed shank with an insert slot prior to securing of the insert.

DETAILED DESCRIPTION OF THE PREFERRED EMBODIMENT

Figure 1:
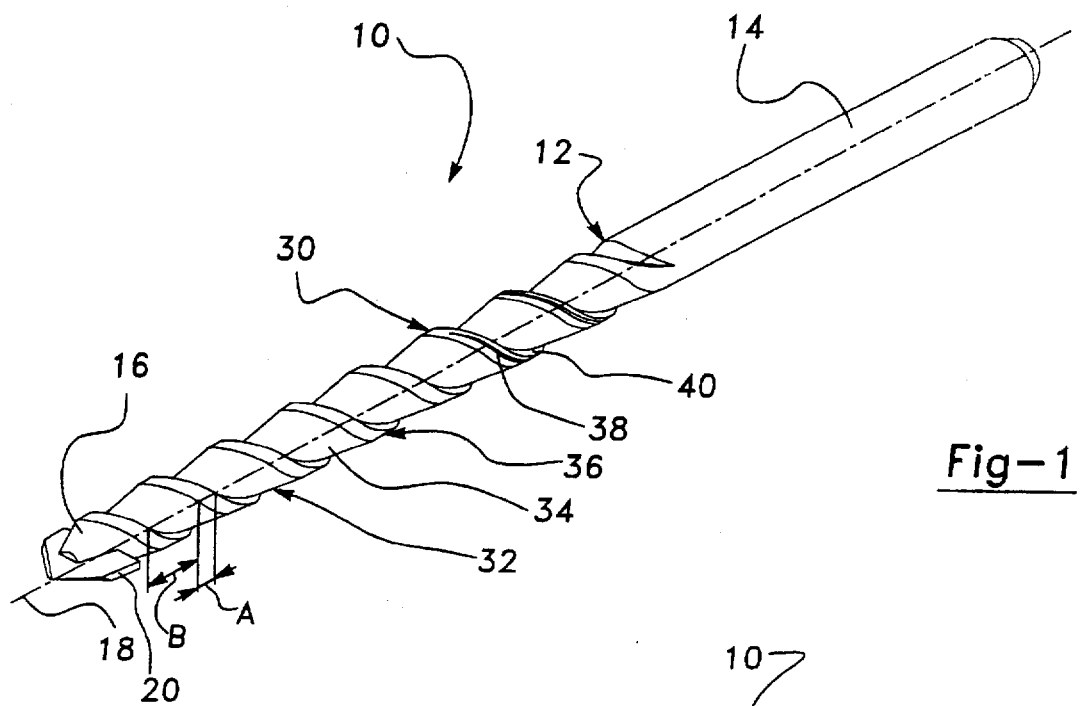
FIG. 1 is a perspective view of a drill bit in accordance with the present invention.

Turning to the Figures, particularly FIG. 1, a cutting tool or drill bit is illustrated and designated with the reference numeral 10. The drill bit 10 has an elongated shank 12 with a chucking end 14 on one end and a cutting head 16 on the other. The shank 12 defines a longitudinal rotational axis 18. The cutting head 16 includes a cutting tip insert 20 ordinarily brazed or welded into the cutting head 16.

The shank 12 includes a flute 30 extending from the cutting head 16 to the chucking end 14. There may be a single flute or a double flute on the cutting tool 10. In the figures, a two flute design is shown. The flutes 30 are helical and will be described in further detail below.

The flute 30 includes a debris channel 32 which is defined by a debris channel side wall 34 and a web 36. The web 36 includes a first surface 38 which is parallel to the axis 18 and a second surface 40 which is angled toward the longitudinal axis 18 and which serves as the base of the debris channel or groove 32.

Figure 2:
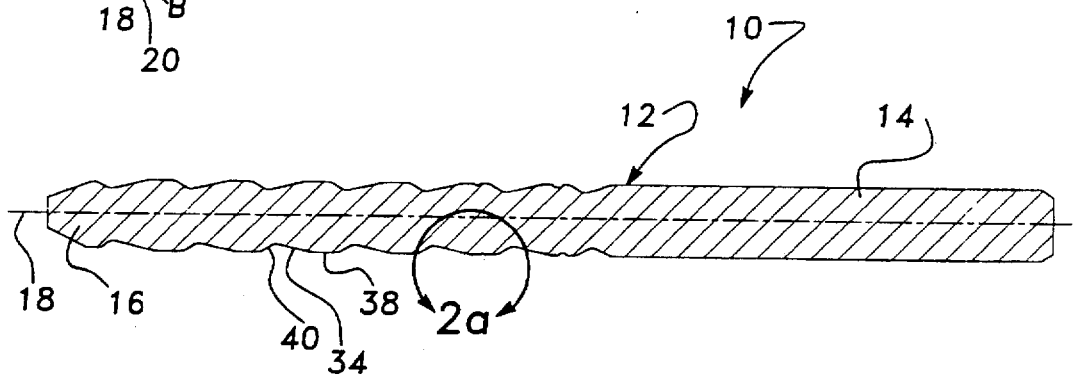
FIG. 2 is a cross section view of FIG. 1 with the insert removed.
Figure 2A:
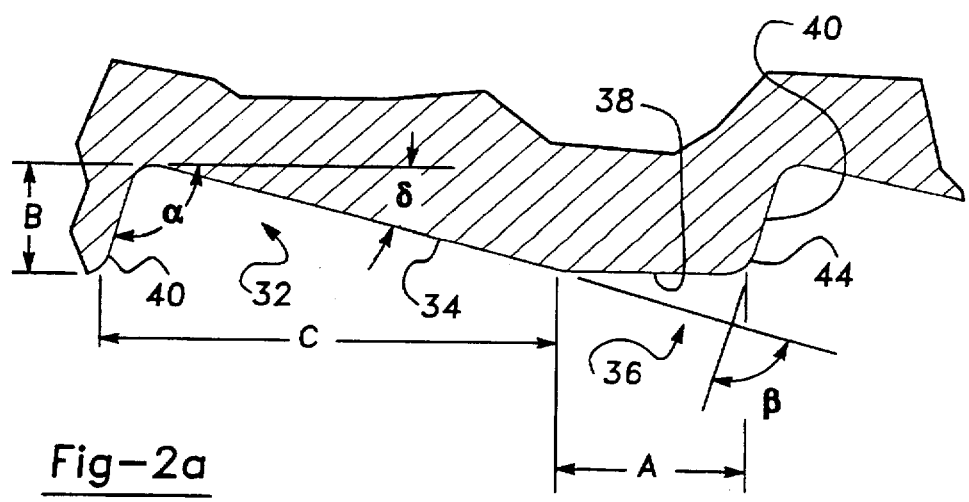
FIG. 2a is an enlarged section view within circle 2a of FIG. 2.

The first surface 38 is parallel to the axis 18 and has a desired axial length along the axis 18 as designated with the reference letter A. The length A is proportional to the working diameter of the cutting tool such that a ratio is formed between the axial length of the first surface to the working diameter D (See FIG. 4). This ratio of the first surface axial length to the working diameter is about 1:3 to about 1:5. Preferably, the ratio is about 1:4. Also the first surface 38 is continuous with the top portion of the debris channel side wall 34 and an arcuate portion 44 connects the first surface 38 with the second surface 40 as seen in FIG. 2a.

The second or base surface 40 is angled with respect to the longitudinal axis 18. The surface 40 is on a plane which is on an angle α of about 100° to about 120° with respect to the longitudinal axis 18. Preferably the angle is about 105° to about 115°, most preferred at about 110°. Also, the depth of the second surface from the first surface, designated by the letter B, is about two-thirds (⅔) of the length of the first surface 38. Also the second surface 40 is angled with respect to the debris channel side wall 34 such that an obtuse angle β is formed between the two surfaces. Ordinarily, the obtuse angle β is between about 91° to about 100° and preferably about 95°.

The debris channel side wall 34 is angled with respect to the longitudinal axis 18. The angle δ formed with the longitudinal axis 18 is about 10° to about 20° and preferably at about 15°. Also, the debris side wall 34 has an axial length along the longitudinal axis 18 defined by the reference letter C. A ratio exists with respect to the axial length of the debris channel side wall 34 to the first surface 38 such wherein the ratio is about 2:1 to about 4:1, and preferably 2.3:1 to 3.5:1 and most preferred at about 3:1. Accordingly, the axial length of both are constant along the longitudinal axis 18.

Thus, the angle δ of the debris side wall 34 as well as the angle α of the second surface 40 optimize the helical debris channel or groove 32 to maximize ejection of debris from the forming hole. The flute 30 maximizes ejection of debris and reduces choking of the debris flow as it is exited from the cutting tip.

The cutting tool 10 of the present invention is formed by a cold rolling process and thus metal is not removed from the blank 60 as it is moved through a die pair 62. As illustrated in FIGS. 3 and 3a, a tool blank 60 is positioned perpendicular to a die pair 62 to form the cutting tool 10. The blank 60 is moved into the dies 62, which include the teeth 64, which form the above described flute into the cutting tool 10. The blank 60 is passed into the dies 62 and as the dies 62 continue to rotate the blank rotates and is formed as it passes through the dies 62. The blank 60, with the flute formed therein, is then positioned into a second machine (not shown) which forms a slot 66 in the cutting head 16 to receive the insert 20. Due to the flute helix geometry, as the blank is grabbed and rotated by the second machine to form the slot 66, the orientation of the blank 60 is always the same due to the above described geometry such that the blank 60 does not have to be manually manipulated to form the slot 66 within the cutting head 16. Thus, the geometry saves valuable time and labor by enabling automatic processing of the cutting tool to form the slot 66 which receives the insert 20 in the blank 60. Once the slot is formed in the cutting head 16, the insert 20 is added into the slot 66 and is brazed or welded to secure the insert in the cutting head 16, thus forming the cutting tool or drill bit 10 of the present invention.

While the above detailed description describes the preferred embodiment of the present invention, the invention is susceptible to modification, variation, and alteration without deviating from the scope and fair meaning of the subjoined claims.

We claim:

1. A method of forming a drill bit with a chucking end, a cutting end and at least one flute between the ends, the at least one flute including a web means and a debris channel, the web means including a first surface and a second surface, comprising the steps of:

providing a pair of rotating dies;

providing a blank;

moving said blank into said dies;

impressing said flute into said blank by deforming walls of the blank along the length of the blank by cold rolling said blank between said pair of rotating dies and during passing of said blank through said rotating dies, forming said first surface substantially parallel to a shank longitudinal axis and continuous with a debris channel surface, and forming said second surface at an angle from about 100° to about 120° with respect to the shank longitudinal axis, wherein said second surface extends inwardly, forming the base of said debris channel, and during said cold rolling forming said debris channel surface between said first surface and said second surface, and forming a side wall of said debris channel such that the side wall is at an angle of from about 10° to 20° with respect to said shank longitudinal axis and creating a ratio of axial length of said first surface to axial length of said debris channel surface at about 2:1 to 4:1.

2. The method according to claim 1, further forming a slot in said cutting end.

3. The method according to claim 2, positioning an insert in said slot.

4. The method according to claim 3, securing said insert in said slot.

5. The method according to claim 4, wherein said securing is by brazing or welding.

* * * * *